United States Patent

[11] 3,537,555

[72] Inventors Dietrich Reister
Herzpgenaurach;
Wolfgang Pfluegner, Niederndorf, Germany
[21] Appl. No. 784,389
[22] Filed Dec. 17, 1968
[45] Patented Nov. 3, 1970
[73] Assignee Industriewerk Schaeffler, OHG
Herzodenauwach, Germany
a corporation of Germany
[32] Priority Jan. 17, 1968
[33] Germany
[31] 1,675,151

[54] OVERRUNNING ROLLER CLUTCH
9 Claims, 8 Drawing Figs.
[52] U.S. Cl. .................................................... 192/45,
308/217
[51] Int. Cl. .................................................... F16d 41/06,
F16c 33/46
[50] Field of Search .......................................... 192/27, 38,
44, 45; 188/82, 84; 81/59.1; 308/217

[56] References Cited
UNITED STATES PATENTS

| | | | |
|---|---|---|---|
| 2,835,364 | 5/1958 | Picard | 192/45 |
| 3,055,472 | 9/1962 | Sauzedde | 192/45 |
| 3,241,641 | 3/1966 | Cowles | 192/45 |
| 3,260,333 | 7/1966 | Benson et al. | 192/45 |
| 3,339,687 | 9/1967 | Cowles | 192/45 |
| 3,404,760 | 10/1968 | Benson et al. | 192/45 |

*Primary Examiner*—Allan D. Herrmann
*Attorney*—Hammond & Littell

ABSTRACT: A grip overrunning roller clutch having a ring provided with camming surfaces and a resilient strip of material, flat in the initial state of manufacture, secured against rotation relative to the ring. The strip is also provided with openings for grip rollers and spring elements, formed integrally therewith, for urging the rollers resiliently against the camming surfaces.

Patented Nov. 3, 1970

1
OVERRUNNING ROLLER CLUTCH

PRIOR ART

Overrunning roller clutches, such as described in U.S. Pat. 3,184,020, are known. They usually comprise a ring, inner ring or outer ring, provided with gripping surfaces, and a cage for holding the grip rollers as well as spring elements which urge the grip rollers resiliently against the gripping surfaces. Basically, at least one spring element is associated with each grip roller. The substantial disadvantages of such constructions reside in the comparatively complex production and assembly owing to the production of many components and the troublesome insertion of the individual spring elements.

For simplifying production, grip roller overrunning clutches have been provided with a plastic cage serving to hold the grip rollers and having spring elements formed integrally therewith for urging the grip rollers against the gripping surfaces of the profiled ring. In such constructions, however, the choice of a suitable plastics material alone gives rise to difficulties since, on the one hand, the cage has to be as stiff as possible, and on the other hand, the spring elements formed integrally on it have to be as resilient as possible. In addition, as a further disadvantage, there is the fact that the spring elements of plastic materials often have impaired resilient properties at elevated service temperatures and lose their initial resilience or elasticity through creep of the material. The manufacture of such spring elements of plastic materials is also only possible by means of expensive radial slide moulds.

To obviate drawbacks of the known constructions, it has been proposed to provide, for resilient urging of the grip rollers, a strip which is flat in the initial state of manufacture having openings for the grip rollers and spring elements formed integrally, and being secured against rotation relative to the ring. Since in this case all spring elements are made in a single working operation and may also be mounted in common, the production of the grip-roller overrunning clutch is substantially simplified, compared with the above-mentioned construction having individual springs. since the resilient strip is made of metal, the desired resilient properties may furthermore be obtained at higher service temperatures.

Now, however, having regard to the desired resilience of the spring elements, a comparatively thin gauge must be selected for the strip, which serves at the same time to hold the grip rollers. This gives rise to certain difficulties in assembly owing to the thereby conditioned instability of the strip, and necessitates considerable care in handling.

OBJECTS OF THE INVENTION

An object of the present improvement in overrunning roller clutches described herein is to provide a simplified unit which can be produced economically. This unit interposed between cylindrical surfaces of two coaxial members makes an economical, efficient positive overrunning roller clutch.

Another object of the invention is to provide resilient tabs for urging the rollers against the outer ring stamped from a single strip of resilient material.

Another object of the invention is to provide a stiff support cage for the rollers since the resilient strip is not strong enough to support the rollers.

These and other objects of the invention will be apparent from the following description and accompanying drawings.

DESCRIPTION OF THE INVENTION

This invention relates to a grip overrunning roller clutch comprising a ring profiled to form camming surfaces, a strip of resilient material secured against rotation relative to the ring and provided with openings thereon for grip rollers and spring elements integrally formed thereon for resilient urging of the rollers against the camming surfaces, the said strip being held by a stiffer supporting cage, provided with openings for the rollers and spring elements.

2

The invention is therefore based on the problem of further developing a grip-roller overrunning clutch of the above-mentioned kind so that manufacture and assembly are still further simplified, and despite good resilient properties of the spring elements, a high stiffness of the grip-roller carrier is insured.

This problem is solved, according to the invention, in that the strip of spring-resilient material is held by a supporting cage of relatively high stiffness, which has openings for receiving the grip rollers and spring elements.

The use of such a supporting cage provides good stability in manufacture and assembly for the component comprising the resilient strip and grip rollers. For the resilient strip, on which the spring elements are formed, it is on the other hand possible to use a very thin, highly elastic material, since it has substantially no roller-holding functions to perform, so that under all service conditions excellent resilient application of the grip rollers against the gripping surfaces is insured. Due to the integral formation of all the spring elements, production and assembly are particularly simple.

These and numerous other details of the invention will be gathered from the following description of examples of two embodiments illustrated in the drawing, in which.

Figure 1:
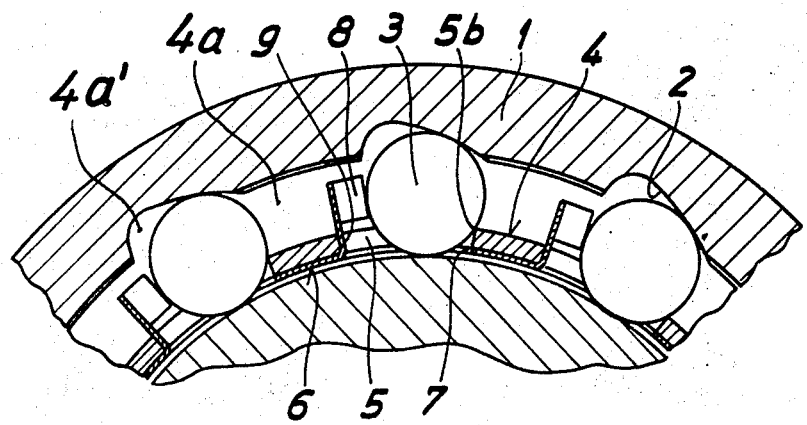
FIG. 1 shows a partial cross section through a first embodiment of a grip-roller overrunning clutch according to the invention and FIG. 2a is a top view of said embodiment.
Figure 2:
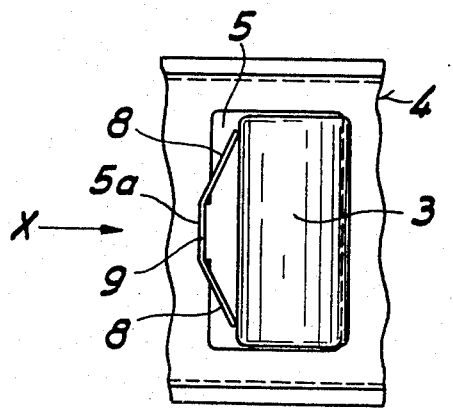
FIG. 2 shows a partial plan of the supporting case provided with resilient strip and the grip rollers.
Figure 3:
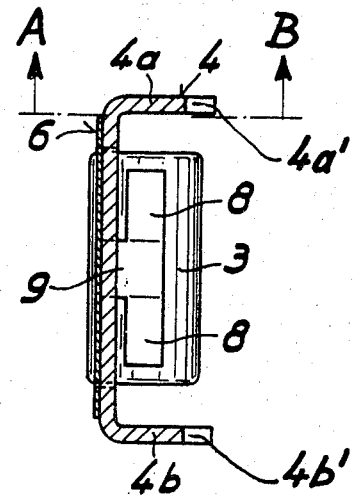
FIG. 3 shows a view in the direction of the arrow x in FIG. 2.
Figure 2A:
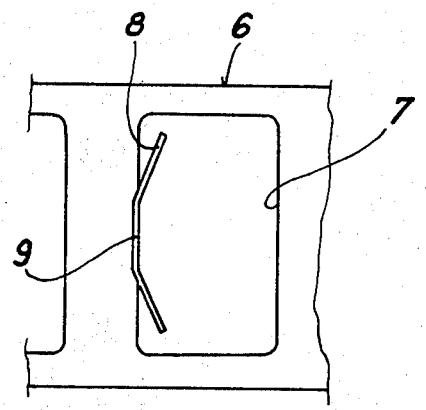
Figure 3A:
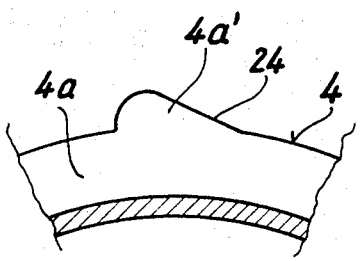
FIG. 3a is a cross section taken along line A—B of FIG. 3.

The grip-roller overrunning clutch shown in FIGS. 1 to 3 comprises an outer ring 1, which is provided with profiled camming surfaces on its inner side to form gripping surfaces 2. The grip rollers 3 are seated in a cage 4, which has a substantially U-shaped cross section. The two side flanges or end rings 4a and 4b of this supporting cage 4 are provided with projections 4a', 4b' with edges 24 profiled radially as shown in FIG. 3a and engaging a mating surface in gripping or camming surface 2. The supporting cage 4 is thus secured against rotation relative to the outer ring 1.

The supporting cage 4 is provided with substantially rectangular openings 5 for receiving the grip rollers 3.

Bearing against the inner side of the supporting cage 4, which is remote from the outer ring 1, is a strip 6 of resilient material, which also has openings 7 for the passage of the grip rollers 3. Furthermore, this resilient strip 6 is provided with tongue-like spring elements 8, which are connected to the main part of the strip 6 by means of a connecting piece 9, and press the grip rollers 3 against the gripping surface 2.

For providing interlocking means thus securing the resilient strip 6 against any axial movement relative to the supporting cage 4, the outwardly bent connecting pieces 9 engage slot-like widened portions 5a of the openings 5 of the supporting cage 4.

Preferably, the resilient strip 6 is made of metal. The supporting cage 4 may also be made of sheet metal, but of substantially greater stiffness, or else, of plastic materials.

The strip 6 is preferably made as a stamping, the spring elements 8 being bent up subsequently. Assembly may be carried out, for example, by first inserting the resilient strip 6 from the inside in the supporting cage 4 when, and because of its resilience, it is applied closely against the inner wall of the supporting cage 4. The grip rollers 3 are then inserted in the unit consisting of cage 4 and strip 6, and are pressed by the spring elements 8 against the opposite edge 5b of the opening 5. The unit may now be pushed in the outer ring 1, the grip rollers 3 being brought to bear against the gripping surfaces 2.

Figure 4A:
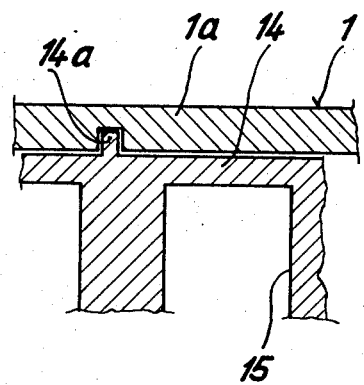
FIG. 4 shows a partial section through a second embodiment of the invention and FIG. 4a is a cross section taken along line C—D of FIG. 4 while omitting resilient strip 16 and rollers 3 for clarity.
Figure 4:
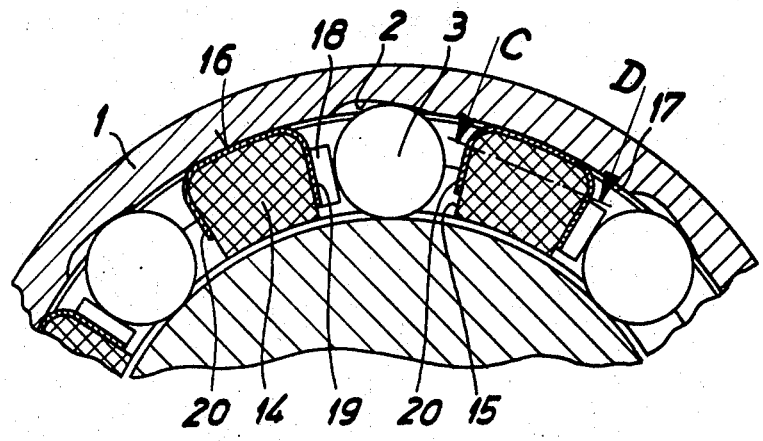
Figure 5:
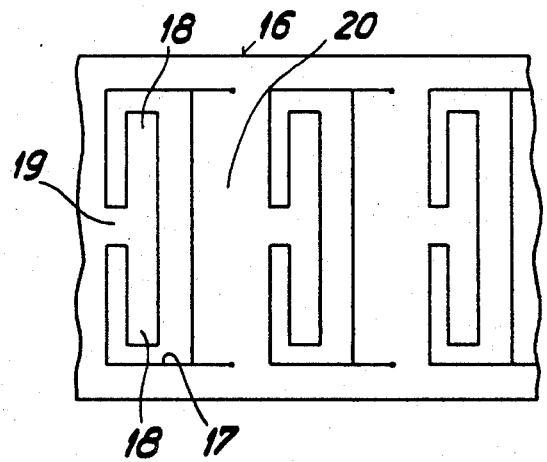
FIG. 5 shows a partial plan of the resilient strip according to FIG. 4 in the initial state as manufactured.

In the second embodiment of the invention shown in FIGS. 4 and 5, an outer ring 1, having gripping surfaces 2 on its inner side, is also provided. In this case, however, the resilient strip 16 is provided between the outer ring 1 and the supporting cage 14.

The supporting cage 14 being of a plastic material, has at least one axial projection 14a which, for securing the supporting cage against rotation, engages a lateral flange 1a of the profiled outer ring 1. The cage 14 is provided with openings 15 for receiving the grip rollers 3 and the spring elements 18 formed integrally on the resilient strip 16.

On the side of the opening 17 for receiving the grip rollers, which is opposite the spring elements 18, the resilient strip 16 has a holding projection 20, likewise formed integrally and partly resiliently embracing the adjacent web of the supporting cage 14. On the other side of the individual webs of the supporting cage 14 is situated the connecting piece 19 carrying the spring elements 18.

Fig. 5 shows the resilient strip 16 in the stamped state, before bending of the holding projections 20 and the connecting pieces 19 with the spring elements 18.

In the two embodiments described, the gripping surfaces 2 are provided on the inside of the profiled ring 1 enclosing the grip rollers 3, supporting cage 4 or 14 and the strip 6 or 16 of resilient material. Instead of this, however, the gripping surfaces may also be provided on the outside of a profiled ring arranged inside of the supporting cage, the strip of resilient material and the ring of grip rollers. Therefore, the invention also covers embodiments having a profiled inner ring.

The preceding specific embodiments are illustrative of the practice of the invention. It is to be understood, however, that other expedients known to those skilled in the art may be employed without departing from the spirit of the invention.

We claim:

1. A grip overrunning roller clutch comprising a ring profiled to form camming surfaces, a strip of resilient material secured against rotation relative to the ring and provided with openings thereon for grip rollers and spring elements integrally formed thereon for resilient urging of the rollers against the camming surfaces, the said strip being held by a stiffer supporting cage, provided with openings for the rollers and spring elements.

2. A clutch of claim 1 wherein the supporting cage has at least one axial projection engaging a side flange of the profiled ring for securing the cage against rotation and the said strip of resilient material lies between the supporting cage and the ring.

3. A clutch of claim 1 wherein the supporting cage has at least one axial projection engaging a side flange of the ring for securing the cage against rotation and the strip of resilient material is arranged on the side of the cage remote from the ring.

4. a A clutch of claim 1 wherein the supporting cage has at least one side flange with an edge profiled radially to the camming surface and engages the camming surface for securing the cage against rotation and the strip of resilient material lies between the supporting cage and ring.

5. A clutch of claim 1 wherein the supporting cage has at least one side flange with an edge profiled radially to the camming surface and engages the camming surface for securing the cage against rotation and the strip of resilient material lies against the side of the cage most remote from the ring.

6. A clutch of claim 1 wherein the side of the openings in the strip of resilient material opposite the spring elements has a holding projection formed integrally thereon, said projection resiliently engaging around the adjacent web of the supporting cage.

7. A clutch of claim 1 wherein the strip of resilient material is secured against axial movement relative to the supporting cage by an interlocking means.

8. A clutch of claim 1 wherein the camming surfaces are provided on the inside of the ring which encloses the rollers, supporting cage and strip of resilient material.

9. a A clutch of claim 1 wherein the supporting cage is secured against rotation relative to the ring.